(12) United States Patent
Li et al.

(10) Patent No.: US 12,464,135 B1
(45) Date of Patent: Nov. 4, 2025

(54) FILLER DATA-BASED ADAPTIVE LAMBDA FOR VIDEO ENCODING

(71) Applicant: ATI Technologies ULC, Markham (CA)

(72) Inventors: Jin Li, Markham (CA); Dong Liu, Markham (CA); Haibo Liu, Markham (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 18/753,235

(22) Filed: Jun. 25, 2024

(51) Int. Cl.
*H04N 19/147* (2014.01)
*H04N 19/124* (2014.01)

(52) U.S. Cl.
CPC ......... *H04N 19/147* (2014.11); *H04N 19/124* (2014.11)

(58) Field of Classification Search
CPC ............................ H04N 19/147; H04N 19/124
See application file for complete search history.

(56) References Cited

U.S. PATENT DOCUMENTS

| | | | |
|---|---|---|---|
| 9,615,085 B2 * | 4/2017 | Wang | H04N 19/176 |
| 10,313,694 B2 * | 6/2019 | Suzuki | H04N 19/423 |

OTHER PUBLICATIONS

"Domain Optimal Bit Allocation Algorithm for High Efficiency Video Coding"; DOI: 10.1109/TCSVT.2017.2598672 © 2017 IEEE (Year: 2017).*
Tang, M., et al., "A Generalized Rate-Distortion-Model Based HEVC Rate Control Algorithm", arXiv:1911.00639v1 [cs.MM], Nov. 2, 2019, 13 pgs.
Li, L., et al., "Domain Optimal Bit Allocation Algorithm for High Efficiency Video Coding", IEEE Transactions on Circuits and Systems for Video Technology, IEEE, 2017, 14 pgs.

* cited by examiner

*Primary Examiner* — Dramos Kalapodas
(74) *Attorney, Agent, or Firm* — Volpe Koenig

(57) ABSTRACT

Techniques for allowing the encoder to use additional data for encoding where the encoder predicts or determines that the encoder will insert filler bits into the encoded video are provided. Specifically, according to these techniques, the encoder uses a modified lambda parameter to calculate rate-distortion cost, which is then used to set encoder settings. In "normal" operation, the encoder utilizes a lambda parameter to designate a trade-off between increasing quality ("distortion") and reducing number of bits consumed. This trade-off is reflected in the "rate-distortion cost." In such "normal" operation, the encoder bases this lambda value on the quantization parameter selected for a block of video to be encoded. When filler bits are predicted to be included in the encoded video data, the encoder modifies the lambda parameter to skew the trade-off more towards minimizing distortion and less towards reducing the number of bits consumed by the encoding.

20 Claims, 5 Drawing Sheets

FILLER DATA-BASED ADAPTIVE LAMBDA FOR VIDEO ENCODING

BACKGROUND

Video encoding is the process of compressing video for transmission and storage. Advances in this area are constantly being made.

BRIEF DESCRIPTION OF THE DRAWINGS

A more detailed understanding may be had from the following description, given by way of example in conjunction with the accompanying drawings wherein.

DETAILED DESCRIPTION

It is possible to perform video encoding using a constant bitrate, which forces the encoder to generate output that consumes a constant amount of data in a given period of time. One issue with such an encoding mode, however, is that if the constant bitrate is set too high, then "normal" encoding procedures will simply not generate enough information to meet the demands of the constant bitrate. In such situations, the encoder inserts filler bits to meet the demanded bitrate, which is wasteful.

The present disclosure provides techniques for allowing the encoder to use additional data for encoding where the encoder predicts or determines that the encoder will insert filler bits into the encoded video. Specifically, according to these techniques, the encoder uses a modified lambda parameter to calculate rate-distortion cost, which is then used to set encoder settings. In "normal" operation, the encoder utilizes a lambda parameter to designate a trade-off between increasing quality ("distortion") and reducing number of bits consumed. This trade-off is reflected in the "rate-distortion cost." In such "normal" operation, the encoder bases this lambda value on the quantization parameter selected for a block of video to be encoded, where the quantization parameter is a measure of how much data is used to encode a block of video.

In the techniques of the present disclosure, this lambda parameter is adjusted if the predicted number of filler bits is greater than a threshold value such as zero. More specifically, the lambda parameter is adjusted to modify the rate-distortion cost, such that the trade-off between increasing quality and reducing number of bits consumed is skewed more towards increasing quality (which has the side-effect that the number of bits consumed is increased). In some examples, the lambda parameter is adjusted based on the predicted number of filler bits, so that if more filler bits are predicted to be used, then the lambda parameter is adjusted such that the rate-distortion cost is skewed more towards increasing quality. The specific mechanisms by which the rate-distortion cost is used for this purpose are described in further detail herein.

Figure 1:
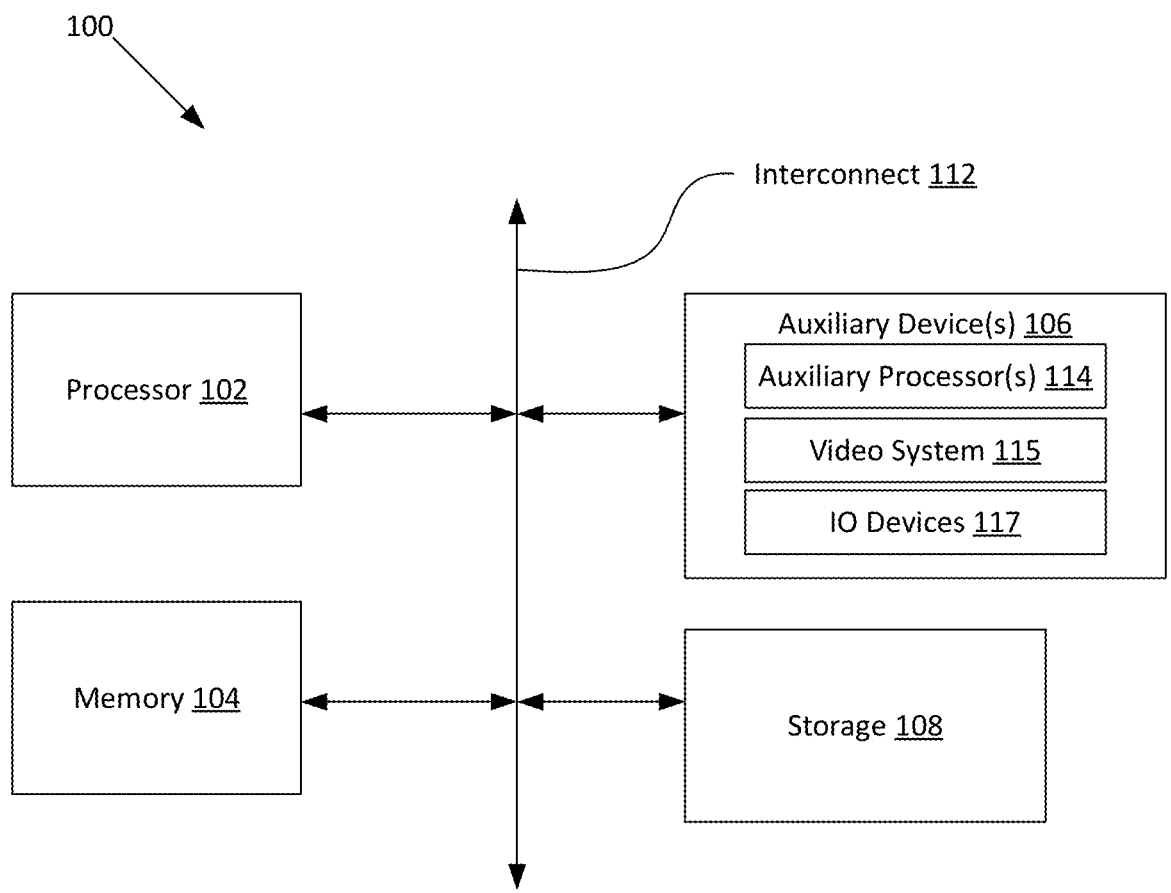
FIG. 1 is a block diagram of an example computing device in which one or more features of the disclosure can be implemented.
Figure 2A:
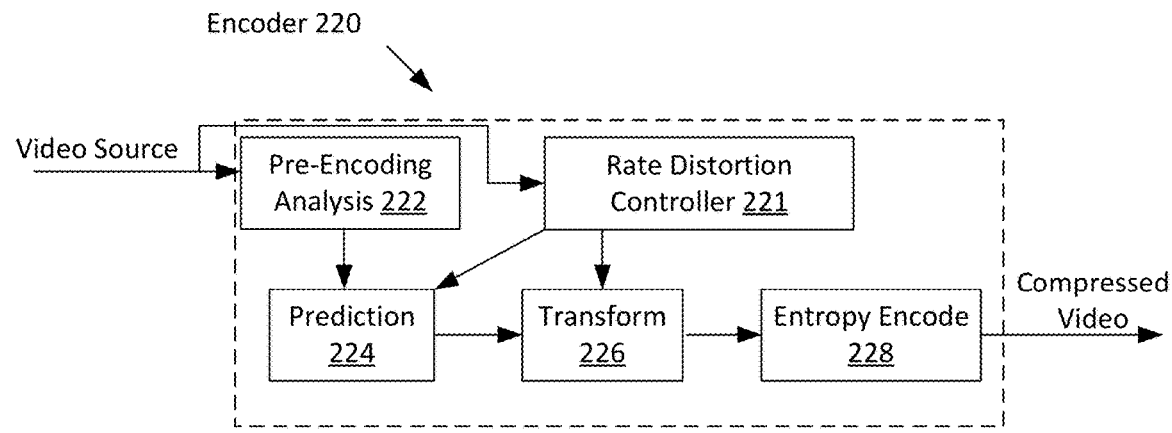
FIG. 2A presents a detailed view of a video encoder, according to an example.
Figure 2B:
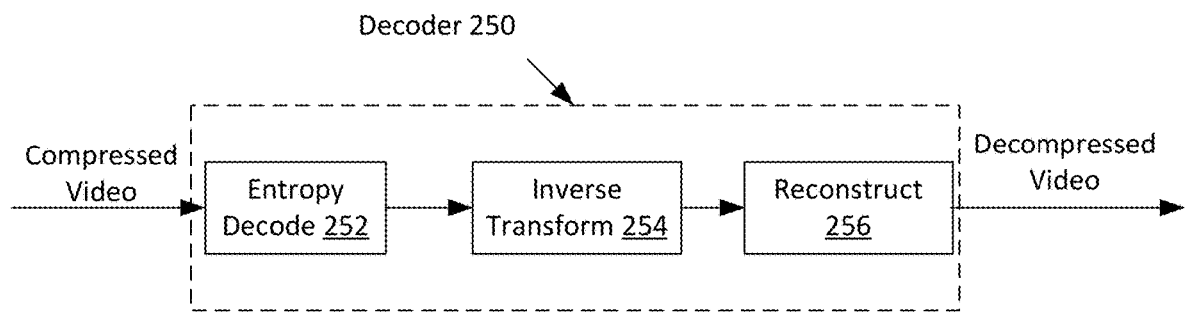
FIG. 2B represents a decoder for decoding compressed data generated by an encoder such as the encoder, according to an example.
Figure 3:
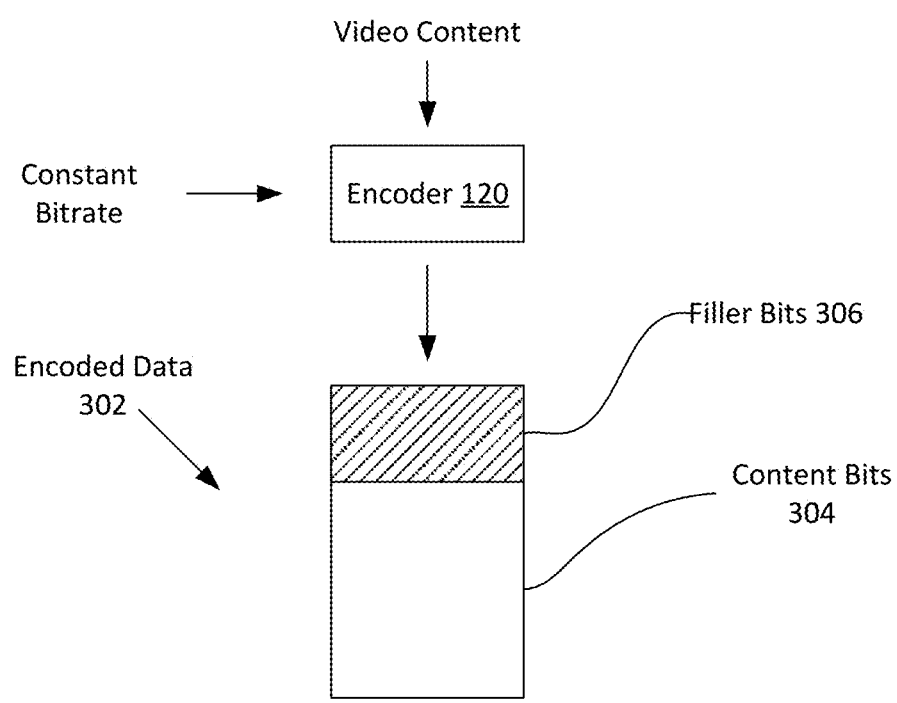
FIG. 3 illustrates an example in which the encoder inserts filler bits into encoded content in order to meet a constant bit rate.
Figure 4:
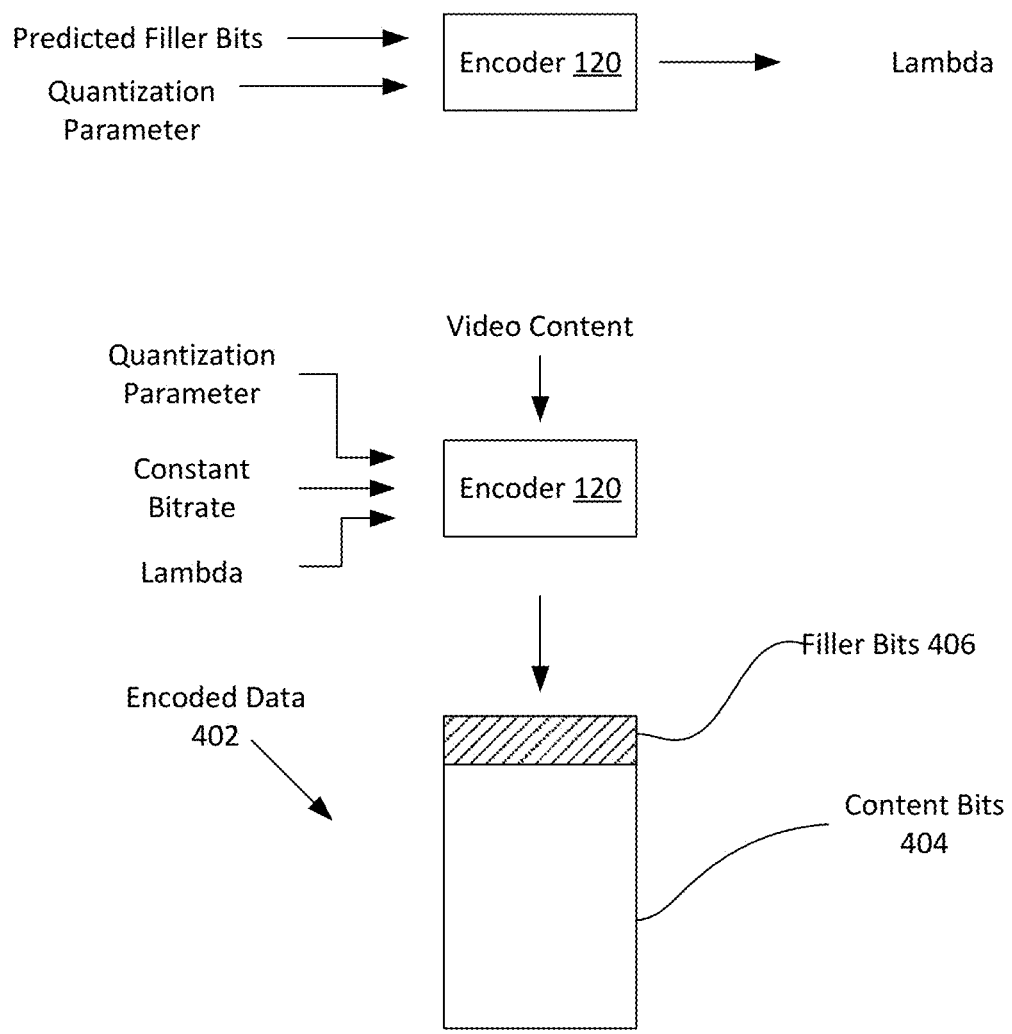
FIG. 4 illustrates a technique for using fewer filler bits and thus more content bits given the same video content to be encoded, according to an example.
Figure 5:
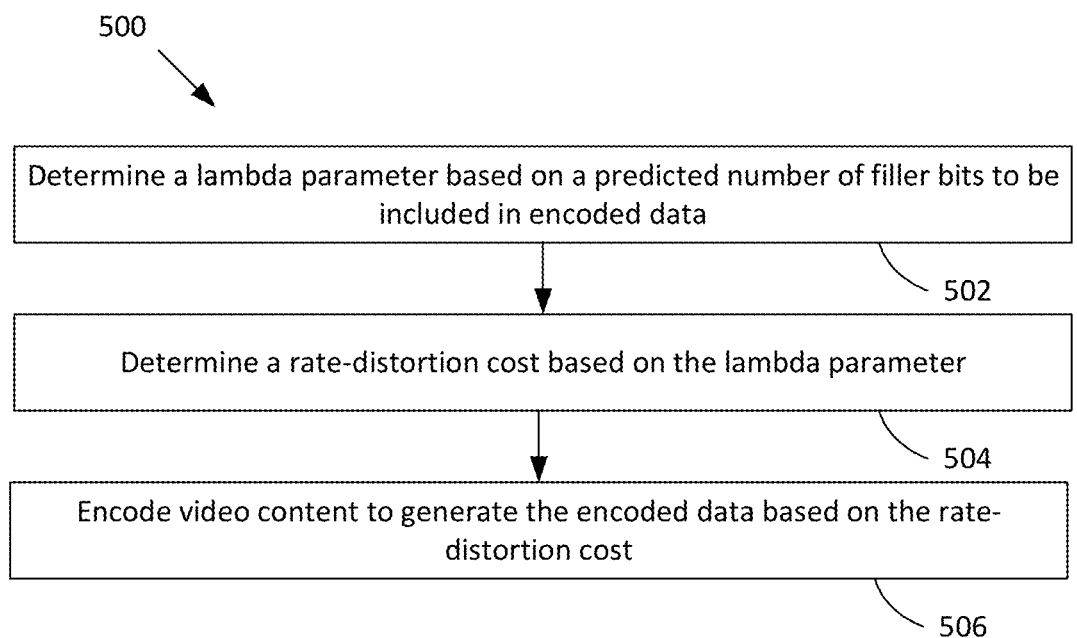
FIG. 5 is a flow diagram of a method for performing encoding operations, according to an example.

FIGS. 1 and 2A-2B describe a system for video encoding. FIG. 3 describes the issue with including filler bits in encoded information. FIG. 4 illustrates a reduction in such filler bits according to the techniques described herein. FIG. 5 depicts a technique for performing video encoding operations.

FIG. 1 is a block diagram of an example computing device 100 in which one or more features of the disclosure can be implemented. In various examples, the computing device 100 is one of, but is not limited to, for example, a computer, a gaming device, a handheld device, a set-top box, a television, a mobile phone, a tablet computer, or other computing device. The device 100 includes, without limitation, one or more processors 102, a memory 104, one or more auxiliary devices 106, and a storage 108. An interconnect 112, which can be a bus, a combination of buses, and/or any other communication component, communicatively links the one or more processors 102, the memory 104, the one or more auxiliary devices 106, and the storage 108.

In various alternatives, the one or more processors 102 include a central processing unit (CPU), a graphics processing unit (GPU), a CPU and GPU located on the same die, or one or more processor cores, wherein each processor core can be a CPU, a GPU, or a neural processor. In various alternatives, at least part of the memory 104 is located on the same die as one or more of the one or more processors 102, such as on the same chip or in an interposer arrangement, and/or at least part of the memory 104 is located separately from the one or more processors 102. The memory 104 includes a volatile or non-volatile memory, for example, random access memory (RAM), dynamic RAM, or a cache.

The storage 108 includes a fixed or removable storage, for example, without limitation, a hard disk drive, a solid state drive, an optical disk, or a flash drive. The one or more auxiliary devices 106 include, without limitation, one or more auxiliary processors 114, and/or one or more input/output ("IO") devices. The auxiliary processors 114 include, without limitation, a processing unit capable of executing instructions, such as a central processing unit, graphics processing unit, parallel processing unit capable of performing compute shader operations in a single-instruction-multiple-data form, multimedia accelerators such as video encoding or decoding accelerators, or any other processor. Any auxiliary processor 114 is implementable as a programmable processor that executes instructions, a fixed function processor that processes data according to fixed hardware circuitry, a combination thereof, or any other type of processor.

The one or more auxiliary devices 106 include a video system 115. The video system 115 includes one or both of a video encoder or a video decoder (e.g., the encoder 220 or decoder 250 of FIGS. 2A and 2B respectively). In various examples, the video system 115 is implemented partially or fully in hardware (e.g., using circuitry such as a programmable processor and/or fixed-function circuitry), partially or fully in software executing on a processor, or as a combination there. Additional disclosure about the encoder and decoder are provided elsewhere herein, such as with reference to FIGS. 2A and 2B.

The one or more IO devices 117 include one or more input devices, such as a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals), and/or one or more output devices such as a display device, a speaker, a printer, a haptic feedback device, one or more lights, an antenna, or a network connection (e.g., a wireless local area network card for transmission and/or reception of wireless IEEE 802 signals).

FIG. 2A presents a detailed view of a video encoder 220, according to an example. The video encoder 220 accepts source video, encodes the source video to produce compressed video (or "encoded video"), and outputs the compressed video. Implementations of the encoder 220 may include blocks other than those shown. The encoder 220 includes a pre-encoding analysis block 222, a prediction block 224, a transform block 226, and an entropy encode block 228. In some alternatives, the encoder 220 implements one or more of a variety of known video encoding standards (such as MPEG2, H.264, or other standards), with the prediction block 224, transform block 226, and entropy encode block 228 performing respective portions of those standards. In other alternatives, the encoder 220 implements a video encoding technique that is not a part of any standard. In various examples, the encoder 220 includes and/or communicates with a memory that stores data for frames being encoded. The data stored includes any combination of data input by or output by the encoder 220.

The prediction block 224 performs prediction techniques to reduce the amount of information needed for a particular frame. Various prediction techniques are possible. One example of a prediction technique is a motion prediction based inter-prediction technique, where a block in the current frame is compared with different groups of pixels in a different frame until a match is found. Various techniques for finding a matching block are possible. One example is a sum of absolute differences technique, where characteristic values (such as luminance) of each pixel of the block in the current block is subtracted from characteristic values of corresponding pixels of a candidate block, and the absolute values of each such difference are added. This subtraction is performed for a number of candidate blocks in a search window. The candidate block with a score deemed to be the "best," such as by having the lowest sum of absolute differences, is deemed to be a match. After finding a matching block, the current block is subtracted from the matching block to obtain a residual. The residual is further encoded by the transform block 526 and the entropy encode block 228 and the block is stored as the encoded residual plus the motion vector in the compressed video.

The transform block 226 performs an encoding step which is typically lossy, and converts the pixel data of the block into a compressed format. An example transform that is typically used is a discrete cosine transform (DCT). The discrete cosine transform converts the block into a sum of weighted visual patterns, where the visual patterns are distinguished by the frequency of visual variations in two different dimensions. The weights afforded to the different patterns are referred to as coefficients. These coefficients are quantized and are stored together as the data for the block. Quantization is the process of assigning one of a finite set of values to a coefficient. The total number of values that are available to define the coefficients of any particular block is defined by the quantization parameter (QP). A higher QP means that the step size between values having unity increment is greater, which means that a smaller number of values are available to define coefficients. A lower QP means that the step size is smaller, meaning that a greater number of values are available to define coefficients. A lower QP requires more bits to store, because more bits are needed for the larger number of available coefficient values, and a lower QP requires fewer bits. Visually, a higher QP is associated with less detail and a lower QP is associated with more detail. Although the concept of QP is defined herein, the term "quality value" is sometimes used herein to generally refer to a value indicating the amount of data afforded for encoding a block, and thus the visual quality with which a block is represented in the encoded video. Numerically, quality value can be thought of as a ranking. Thus, a higher quality value means that a block is afforded a lower number of bits and is thus encoded with lower quality and a lower quality value means that a block is afforded a higher number of bits and is thus encoded with higher quality. It should be understood that although quality values are described herein as a "ranking" (with a lower number meaning higher quality and a higher number meaning lower quality), it is possible for other types of quality values to be used. For example, it is possible to use quality values where a higher number means a higher quality and a lower number means a lower quality. In some situations, the term quantization parameter is used herein. Any instance of that term can be replaced with the term "quality value."

The entropy encode block 228 performs entropy coding on the coefficients of the blocks. Entropy coding is a lossless form of compression. Examples of entropy coding include context-adaptive variable-length coding and context-based adaptive binary arithmetic coding. The entropy coded transform coefficients describing the residuals, the motion vectors, and other information such as per-block QPs are output and stored or transmitted as the encoded video.

The pre-encoding analysis block 222 performs analysis on the source video to adjust parameters used during encoding. One operation performed by the pre-encoding analysis block includes analyzing the source video to generate information for use by the rate control QP setting, which determines what QPs should be afforded to the blocks for encoding. Additional details about determining QPs for encoding blocks are provided below.

The rate distortion controller 211 controls settings based on a rate distortion cost parameter, as described in further detail below. In various examples, the rate distortion controller 211 comprises software executing on a processor, hardware (e.g., circuitry such as a programmable, or fixed-function processor, a field-programmable gate array, a programmable logic device, or any other technically feasible type of circuitry), or a combination thereof.

FIG. 2B represents a decoder 250 for decoding compressed data generated by an encoder such as the encoder 220, according to an example. The decoder 260 includes an entropy decoder 252, an inverse transform block 254, and a reconstruct block 256. The entropy decoder 252 converts the entropy encoded information in the compressed video, such as compressed quantized transform coefficients, into raw (non-entropy-coded) quantized transform coefficients. The inverse transform block 254 converts the quantized transform coefficients into the residuals. The reconstruct block 256 obtains the predicted block based on the motion vector and adds the residuals to the predicted block to reconstruct the block.

Note that the operations described for FIGS. 2A and 2B only represent a small subset of the operations that encoder and decoders may use.

In various examples, the encoder 220 and/or decoder 250 are implemented within the device 100. In an example, either or both of the encoder 220 and decoder 250 are any of software executing on a processor such as the processor 102 or the APD 116, hardware (e.g., circuitry) such as a processor of any type (e.g., a fixed function analog or digital processor, a programmable processor, a configurable logic array), or any other type of hardware, or a combination of software and hardware. In some examples, the device 100 (e.g., the video system 115) includes an encoder 220, a decoder 250, or both the encoder 220 and decoder 250.

As described above, the rate distortion controller 211 sets the rate distortion cost. The rate distortion cost parameter is a parameter whose purpose is to minimize the combination of "rate distortion" and number of bits consumed by a portion of a frame (e.g., a block). The rate distortion cost can be specified on any technically feasible amount of data, such as for a portion of a frame (e.g., a certain percentage of the frame area or a block) or for an entire frame. The rate distortion indicates the amount of "distortion" of that portion of the frame, where "distortion" is some characterization of the difference between the encoded block and the original, pre-encoded data. In other words, the distortion measures how well the encoded video represents the original video. In some examples, the "distortion" is calculated by performing a sum of absolute differences on the pixels of a reconstructed version of the encoded video and the original raw video. The reconstructed version of the encoded video includes a decoded version of the encoded version of a portion of the video. The sum of absolute differences is thus a measure of the sum of the differences between the encoded video (which must be decoded to perform a pixel by pixel comparison) and the original video. The number of bits consumed by the portion of the frame is just that—a measure representative of how many bits (how much data) is consumed by the encoding.

The rate distortion cost also includes a parameter—called lambda—that provides a trade-off between the distortion and the bits consumed. More specifically, the lambda parameter controls what the encoder 120 optimizes for. In an example, for a high lambda parameter value, the encoder 120 optimizes for bit rate—attempting to minimize bit rate while considering distortion to a relatively lesser degree, while for a low lambda parameter value, the encoder 120 optimizes more for distortion as compared with bit rate. In an example, the following expression relates rate distortion cost, lambda, distortion, and the number of bits consumed:

$$J = \min(D + \text{lambda} * R)$$

where J is the rate-distortion cost, D is the distortion, and R is the number of bits. Using this expression, the encoder 120 attempts to minimize the sum of D+lambda*R. If lambda is low, then the primary factor being minimized is the distortion. By contrast, a higher lambda results in a more balanced consideration of distortion and data bits, with the encoder 120 minimizing both. A much higher lambda results in minimization of the data bits, without much consideration of the distortion.

In addition to the above, in some examples, the encoder 120 sets the lambda parameter based on the quantization parameter as well as, in some examples, frame type (e.g., inter, intra). More specifically, in some examples, the encoder 120 sets a higher lambda for a higher quantization parameter and a lower lambda for a lower quantization parameter. As stated above, a higher lambda results in minimization of data bits. With a high quantization parameter, the encoding quality is generally lower and the amount of data consumed by a block is relatively low. Thus, where a high quantization parameter is used, the primary concern for encoding is the amount of data consumed as opposed to encoding quality. For this reason, a high quantization parameter results in a high lambda. By contrast, where the quantization parameter is low, the primary concern is encoding quality, and thus a lower lambda is used, resulting in the encoder 120 attempting to minimize distortion. In some examples, the encoder 120 sets the lambda value using the following relationship:

$$QP = c1 * \ln(\text{lambda}) + c2$$

Solving for lambda gives the expression:

$$\text{lambda} = e^{\frac{QP - c2}{c1}}$$

In the above expression, c1 and c2 are variables related to the content of the video and to compression performance. In some examples, c1 and c2 are set empirically based on experiment to give desired results and can thus be selected in any technically feasible manner.

As can be seen, the lambda value is related to the quantization parameter value. The encoder 120 determines the quantization parameter value using any technically feasible means, such as using rate control (i.e., determination of how much data is to be afforded to frames, blocks, or other units of encoded video), pre-encoding analysis (e.g., as performed by the pre-encoding analysis block 222), or in any other technically feasible manner.

In some situations, it is desirable to use a constant bit rate encoding mode. A constant bit rate encoding mode requires that data for the video is transmitted through a network such as the Internet at a constant bit rate. In some examples where constant bit rate is used, the bit rate is set to a rate that is "too high" for the video content. In such an example, it is not possible to encode the video using all of the bits designated by the constant bit rate. In some such examples, the encoder 120 inserts filler bits that serve no purpose other than to consume the amount of data specified by the constant bit rate.

FIG. 3 illustrates an example in which the encoder 120 inserts filler bits into encoded content in order to meet a constant bit rate. As can be seen, the encoder 120 accepts video content to be encoded and an indication of a constant bitrate. Based on these inputs, the encoder 120 generates encoded data 302 which includes content bits 304 and filter bits 306. The content bits 304 represent data encoding the actual encoded content (such as motion vectors, residuals, metadata, and other information), and the filter bits 306 represent bits that have no bearing on the encoding of the video and are inserted into the encoded data 302 by the encoder 120 simply for the purpose of consuming the amount of data specified by the constant bitrate. As can be seen, there is a substantial amount of filler bits 306 that represent wasted memory, transmission bandwidth, and/or other computing resources.

It should be understood that these filler bits are present because the encoder dictates a particular set of parameters, such as quantization parameters. Through the expression described above, these parameters, including the quantization parameters, determine the rate distortion cost, which determines the various encoding parameters such as the frame type (e.g., infra or inter), block size (e.g., how big the blocks are), motion vector fidelity (e.g., the search radius for motion vectors), and other aspects. Since the lambda parameter described above is related to the quantization parameters, the relationship between the quantization parameter and rate distortion cost is fixed if the predicted number of filler bits is not considered. For example, very simple content can be easily encoded using encoder settings that do not consume very much data, and thus can result in there being excess bits that must be filled with filler bits.

For the above reasons, FIG. 4 illustrates a technique for using fewer filler bits 306 and thus more content bits 304 given the same video content to be encoded, and constant bitrate value. In this example, the encoder 120 accepts a value indicating a number of predicted filler bits as well as a quantization parameter, and generates a new lambda value (shown as "lambda") based on these items. In some examples, the predicted number of filler bits is equal to the number of filler bits used in the last frame or is based on that value (e.g., is equal to that value modified by some adjustment taking into account comparative differences between the previous frame and the current frame). The encoder 120 then uses the constant bitrate, the quantization parameter, and the new lambda value to produce encoded data 402. The encoded data has fewer filler bits 406 than if the lambda value using the number of filler bits were not used (e.g., if the lambda value were calculated based on the quantization parameter but not the predicted number of filler bits).

As stated above with respect to FIG. 3, in that example, the lambda value is generated based on the quantization parameter, along with variables c1 and c2. In the example of FIG. 4, a "virtual" quantization parameter is used to calculate the lambda, rather than directly using the quantization parameter as in FIG. 3. Herein, a distinction between these quantization parameters will be made by referring to this new quantization parameter as the "virtual" quantization parameter and to the original quantization parameter as the "actual" quantization parameter. In an example, the encoder 120 generates a virtual quantization parameter that is lower than or equal to the actual quantization parameter, by deducting an amount from the actual quantization parameter that is based on the predicted number of filler bits. More specifically, the greater the number of filler bits, the more the virtual quantization parameter is reduced. As described above, a reduction in quantization parameter, and thus a reduction in lambda parameter, results in a higher consideration given to the distortion, when calculating the rate-distortion cost. Thus, decreasing the lambda parameter by using a decreased virtual quantization parameter to calculate the lambda parameter causes the encoder 120 to perform operations that increase encoding quality, since the encoder 120 attempts to minimize the rate-distortion cost, and the rate-distortion cost is related to encoding quality.

In some examples, the encoder 120 utilizes the ratio of: (filler bits plus actual bits) divided by (actual bits), to reduce the actual quantization parameter to generate the virtual quantization parameter. In some examples, the encoder 120 utilizes the logarithm of that ratio to reduce the actual quantization parameter to generate the virtual quantization parameter. In some examples, the encoder 120 generates the virtual quantization parameter using the following expression:

$$QP_{virtual} = QP_{actual} - C * \log_2 \frac{(\text{fillerbits} + \text{actualbits})}{\text{actualbits}}$$

where C is a constant (in some examples, 6), $QP_{virtual}$ is the virtual quantization parameter, $QP_{actual}$ is the actual quantization parameter, fillerbits is the predicted number of filler bits, and actualbits is the actual number of actual bits encoded (e.g., the content bits 404). The encoder 120 then uses the $QP_{virtual}$ value to generate the lambda value, for example with the following expression:

$$\text{lambda} = e^{\frac{QP_{virtual} - c2}{c1}}$$

More generally, the encoder 120 generates the lambda in a manner such that lambda increases as $QP_{virtual}$ increases and decreases as $QP_{virtual}$ decreases, taking into account encoding c1 and c2, which are related to the content of the video and to compression performance. In some examples, the relationship between lambda and $QP_{virtual}$ is exponential/logarithmic, as shown with use of the natural logarithm/euler's number exponent in the expression described above.

Once the encoder 120 has obtained the lambda parameter, the encoder 120 uses that lambda parameter to generate a rate distortion cost in a similar manner as described above, e.g.: J=min(D+lambda*R). Then, the encoder 120 uses the rate distortion cost to make encoding decisions. In some examples, the encoder 120 uses the actual quantization parameter for generating the content bits of blocks being encoded (e.g., to set the values for the transform coefficients), but uses the rate distortion cost derived from the virtual quantization parameter described above to make encoding decisions other than setting the quantization parameter. Some example settings that the encoder 120 uses the rate distortion cost to set include: the motion vector search range, the block encoding mode, the block size, and the frame type selection. Other example settings include a restoration filter in the AV1 compression scheme.

The motion vector search range includes the range over which the encoder 120 searches to select motion vectors. More specifically, a motion vector is a vector that indicates the location of a reference block as compared with the block being encoded. When encoding is being performed, the encoder 120 searches over a range of locations to select a motion vector deemed to be "the best." If the search radius is smaller, it takes fewer bits to specify the motion vector, but the "best vector" that is found can be of lower quality than if the search radius were larger. Thus search vector radius represents a tradeoff between data amount and encoding quality. In some examples, a higher rate distortion cost results in a smaller radius and a lower rate distortion cost results in a larger radius.

In some examples, the encoding mode decision includes a decision of whether the block is an intra block, or inter block. An intra block is a block that is encoded with reference to no other frame. An inter block is a block that is encoded with reference to other frames in addition to the frame that the block is within. In some examples, a higher rate distortion cost is associated with selecting an inter block and a lower rate distortion cost is associated with selecting an intra block.

In some examples, the block size is a size of an encoded block (e.g., in pixels). In some examples, a smaller size is associated with a lower rate distortion cost, since more data is needed for smaller blocks for the same portion of the frame, and a larger size is associated with a higher rate distortion cost.

In some examples, the frame type includes selection of an inter frame or an intra frame. An intra frame is encoded only with reference to other elements of the frame and an inter frame is encoded with reference to other frames. A lower rate distortion cost is associated with intra frames and a higher rate distortion cost is associated with inter frames.

In summary, the encoder 120 uses a prediction of how many filler bits would be included in an encoded frame in order to adjust the rate-distortion cost. The adjustment is made so that the encoded frame consumes more bits for content data, as opposed to filler data. In some examples, the adjustment affects encoding parameters other than quantization parameters, such as those listed above. In some examples, this adjustment occurs by adjusting a lambda parameter that influences the trade-off between distortion (e.g., encoding quality) and data consumed by the encoding. Specifically, the adjustment increasing the influence of distortion as compared with data consumed. These operations reduce the number of content bits in the situation that a constant bit rate is used and the content does not need all of the available bits. In some examples, the adjustment to rate-distortion cost is as compared with a situation in which variable bitrate is used, or is as compared with a situation in which the actual number of filler bits is 0. In other words, in examples where a variable bitrate is used, or where there are no filler bits, the encoder 120 sets the lambda parameter according to a first expression (e.g., lambda=eQP−c2/c1), and in a situation in which a constant bitrate is used and there are predicted filler bits, the encoder 120 sets the lambda parameter (a "modified lambda parameter") to cause the rate distortion cost to minimize distortion more heavily than bits consumed, as compared with the first expression. In other words, in situations where the modified lambda parameter is used (e.g., where there is a constant bitrate with filler bits predicted to be used), the lambda parameter is set to cause the encoder 120 to minimize distortion to a greater degree than in situations where the modified lambda parameter is not used. As stated above, minimizing distortion in this manner, and thus favoring distortion reduction over bit consumption reduction, results in a rate-distortion cost parameter that causes adjustments to be made to the encoding, other than quantization parameter adjustments, to cause the encoder to consume more bits, as compared with the situation in which the modified lambda parameter is not used. In some examples, the encoder 220 calculates the virtual QP as $$QP_{virtual} = QP_{actual} - C * \log_2 \frac{(fillerbits + actualbits)}{actualbits}$$

as described above. In some examples, the lambda is calculated as $$lambda = e^{\frac{QP_{virtual} - c2}{c1}}$$

as described above.

Above it is stated that the encoder 120 uses the "virtual QP" parameter to determine the lambda parameter, and that this virtual QP is not used as the actual QP. In some examples, however, the encoder 120 utilizes an adaptive minimum QP value. More specifically, the encoder 120 determines a value—a minimum QP value—that serves as a "cap" or limit to the QP value that can be set of any given block being encoded. In some examples, a user- or application-set minimum QP value also exists, and the encoder 120 is only permitted to adjust the adaptive minimum QP to be as low as the user- or application-set minimum QP. In some examples, where a constant bitrate is used and there are more than zero predicted filler bits, the encoder 120 sets the adaptive minimum QP to be equal to the virtual QP, capped by the user- or application-set minimum QP. In other words, in some examples, where constant bitrate is used and there are more than zero predicted filler bits, and where the virtual QP is greater than or equal to the application- or user-set minimum QP, the encoder 120 uses the virtual QP as the adaptive minimum QP. In other situations, the encoder 120 uses a different QP as the adaptive minimum QP.

FIG. 5 is a flow diagram of a method 500 for performing encoding operations, according to an example. Although described with respect to the system of FIGS. 1-4, those of skill in the art will understand that any system configured to perform the steps of the method 500 in any technically feasible order falls within the scope of the present disclosure.

At step 502, an encoder 220 determines a lambda parameter based on a predicted number of filler bits to be included in encoded data. As described elsewhere, it is possible, where a constant bitrate is used, for encoded data for a frame of video to include a number of filler bits. In an example, baseline encoder settings, determined at least based on the content of the video, result in a certain number of bits used to store video content. If the number of bits used to store content data is less than the number dictated by the constant bitrate, then the encoder 220 adds filler data to consume the amount required by the constant bitrate.

The lambda parameter of step 502 adjusts the amount of data used for the video content upwards by modifying the rate-distortion cost parameter, described with respect to step 504. To do this, the encoder generates a "virtual" quantization parameter value that is used to generate the lambda value. More specifically, as described elsewhere herein, the encoder 220 generates an adjusted lambda value by generating a virtual QP value and setting the lambda value based on this virtual QP value. In some examples, the virtual QP value is a value that has a reduced magnitude as compared with the "actual" quantization parameter value used to encode the block (e.g., used to quantize values such as DCT coefficients for the block). In some examples, the amount of the reduction is based on the number of filler bits, with a larger number of filler bits resulting in a higher reduction than with a smaller number of filler bits. In some examples, the encoder 120 determines the lambda parameter At step 504, the encoder 220 determines a rate-distortion cost that is based on the lambda parameter. The rate distortion cost is a value that balances the distortion as described elsewhere herein (e.g., the measure of how well or how poorly the encoded version of the content reflects the original video content) with the number of bits used to encode the content. In some examples, the lambda parameter affects the trade-off between distortion and number of bits in the rate distortion cost. In some examples, a lower lambda parameter reflects a greater consideration of distortion (e.g., higher quality) and a higher lambda parameter reflects a greater consideration of number of bits (e.g., sacrificing quality for more compact encoding). In some examples, the rate distortion cost is a sum of the distortion and lambda multiplied by the number of bits in the encoded content.

At step 506, the encoder 220 encodes video content to generate encoded data based on the rate-distortion cost. This encoding can be performed in any technically feasible manner, such as according to the techniques described above with respect to FIG. 2A. Using the rate-distortion cost to generate the video content means that the encoder 220 selects encoding parameters to minimize the calculated rate distortion cost. In some examples, the encoder 220 encodes content (e.g., a block) of a frame using different sets of encoding parameters and selects the set of encoding parameters that result in the lowest rate distortion cost. In some examples, the encoder 220 uses a look-up table or other mechanism (e.g., an algorithmic mechanism and/or using a data structure other than a look-up table) to determine encoder settings based on the rate distortion cost. In some examples, the encoder 220 uses the actual quantization parameter to perform encoding for a block, but uses the rate-distortion cost calculated using the lambda parameter that is based on the virtual quantization parameter to determine settings other than the QP for the block.

Each of the units illustrated in the figures represent hardware circuitry configured to perform the operations described herein, software configured to perform the operations described herein, or a combination of software and hardware configured to perform the steps described herein. For example, the processor 102, memory 104, any of the auxiliary devices 106, the storage 108, interconnect 112, encoder 220, including rate-distortion controller 221, pre-encoding analysis 222, prediction 224, transform 226, and entropy encode 228, and decoder 250, include entropy decode 252, inverse transform 254, and reconstruct 256, are implemented fully in hardware, fully in software executing on processing units, or as a combination thereof. In various examples, any of the hardware described herein includes any technically feasible form of electronic circuitry hardware, such as hard-wired circuitry, programmable digital or analog processors, configurable logic gates (such as would be present in a field programmable gate array), application-specific integrated circuits, or any other technically feasible type of hardware.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for encoding video comprising:
    selecting a lambda parameter based on a predicted number of filler bits to be included in encoded video data; and
    encoding video data to generate the encoded video data based on the lambda parameter.

2. The method of claim 1, wherein the lambda parameter controls a trade-off between improving distortion and decreasing data consumed by the encoded video data.

3. The method of claim 1, wherein encoding the video data is performed using a rate-distortion cost that is based on the lambda parameter.

4. The method of claim 3, wherein encoding the video data comprises minimizing the rate-distortion cost.

5. The method of claim 2, wherein the lambda parameter that is based on the predicted number of filler bits controls the trade-off to skew more towards improving distortion as compared with use of a lambda parameter that is not based on the predicted number of filler bits.

6. The method of claim 1, wherein selecting the lambda parameter comprises selecting a value that is based on a virtual quantization parameter.

7. The method of claim 6, wherein the virtual quantization parameter is equal to an actual quantization parameter used to encode the video data, minus a value that is based on the predicted number of filler bits.

8. The method of claim 4, wherein encoding the video data includes selecting one or more encoding parameters to minimize the rate-distortion cost.

9. The method of claim 8, further comprising performing a plurality of trial encodings, measuring rate-distortion cost of the trial encodings, and selecting, as a set of parameters with which to generate the encoded video data, a trial encoding resulting in a lowest rate-distortion cost.

10. An system comprising:
    a memory configured to store encoded video data; and
    an encoder processor configured to:
        select a lambda parameter based on a predicted number of filler bits to be included in encoded video data; and
        encode video data to generate the encoded video data based on the lambda parameter.

11. The system of claim 10, wherein the lambda parameter controls a trade-off between improving distortion and decreasing data consumed by the encoded video data.

12. The system of claim 10, wherein encoding the video data is performed using a rate-distortion cost that is based on the lambda parameter.

13. The system of claim 12, wherein encoding the video data comprises minimizing the rate-distortion cost.

14. The system of claim 11, wherein the lambda parameter that is based on the predicted number of filler bits controls the trade-off to skew more towards improving distortion as compared with use of a lambda parameter that is not based on the predicted number of filler bits.

15. The system of claim 10, wherein selecting the lambda parameter comprises selecting a value that is based on a virtual quantization parameter.

16. The system of claim 15, wherein the virtual quantization parameter is equal to an actual quantization parameter used to encode the video data, minus a value that is based on the predicted number of filler bits.

17. The system of claim 13, wherein encoding the video data includes selecting one or more encoding parameters to minimize the rate-distortion cost.

18. The system of claim 17, wherein the encoder processor is further configured to perform a plurality of trial encodings, measuring rate-distortion cost of the trial encodings, and selecting, as a set of parameters with which to generate the encoded video data, a trial encoding resulting in a lowest rate-distortion cost.

19. A non-transitory computer-readable medium storing instructions that, when executed by a processor, cause the processor to perform operations comprising:
- selecting a lambda parameter based on a predicted number of filler bits to be included in encoded video data; and
- encoding video data to generate the encoded video data based on the lambda parameter.

20. The non-transitory computer-readable medium of claim 19, wherein the lambda parameter controls a trade-off between improving distortion and decreasing data consumed by the encoded video data.

* * * * *